(12) United States Patent
Eungard

(10) Patent No.: US 8,510,888 B2
(45) Date of Patent: Aug. 20, 2013

(54) DOCK LEVELER SEALING SYSTEMS

(75) Inventor: William C. Eungard, Waterford, WI (US)

(73) Assignee: 4Front Engineered Solutions, Inc., Carrollton, TX (US)

(*) Notice: Subject to any disclaimer, the term of this patent is extended or adjusted under 35 U.S.C. 154(b) by 0 days.

(21) Appl. No.: 13/342,824

(22) Filed: Jan. 3, 2012

(65) Prior Publication Data

US 2013/0167310 A1    Jul. 4, 2013

(51) Int. Cl.
*E01D 1/00* (2006.01)

(52) U.S. Cl.
USPC ............................................ 14/71.1; 52/173.2

(58) Field of Classification Search
USPC ............ 14/71.1, 71.3, 74; 52/173.2; 277/921
See application file for complete search history.

(56) References Cited

U.S. PATENT DOCUMENTS

| | | | |
|---|---|---|---|
| 4,286,410 A | 9/1981 | Hahn | |
| 4,293,969 A * | 10/1981 | Frommelt | 14/71.1 |
| 4,422,199 A * | 12/1983 | Frommelt | 14/71.1 |
| 4,557,008 A | 12/1985 | Jurden | |
| 4,682,382 A | 7/1987 | Bennett | |
| 5,001,799 A | 3/1991 | Alexander et al. | |
| 5,313,681 A | 5/1994 | Alexander | |
| 5,396,676 A * | 3/1995 | Alexander et al. | 14/71.1 |
| 5,442,825 A | 8/1995 | Hahn et al. | |
| 6,073,402 A | 6/2000 | Moody | |
| 6,502,268 B2 * | 1/2003 | Ashelin et al. | 14/71.1 |
| 6,654,976 B2 * | 12/2003 | Digmann et al. | 14/69.5 |
| 7,146,673 B1 * | 12/2006 | Digmann et al. | 14/71.5 |
| 7,334,281 B2 * | 2/2008 | Digmann et al. | 14/71.1 |
| 7,444,785 B2 | 11/2008 | Dillon et al. | |
| 7,584,517 B2 * | 9/2009 | Digmann et al. | 14/71.1 |
| 7,594,290 B2 * | 9/2009 | Eungard et al. | 14/69.5 |
| 7,877,831 B2 * | 2/2011 | Digmann et al. | 14/71.1 |
| 8,046,857 B2 | 11/2011 | Whitley et al. | |
| 2002/0152562 A1 | 10/2002 | Ashelin et al. | |
| 2003/0005530 A1 | 1/2003 | Digmann et al. | |
| 2005/0053427 A1 | 3/2005 | Dillon et al. | |
| 2005/0102929 A1 | 5/2005 | Hoffmann et al. | |
| 2007/0101517 A1 | 5/2007 | Digmann et al. | |
| 2007/0101518 A1 | 5/2007 | Digmann et al. | |
| 2007/0101519 A1 | 5/2007 | Digmann et al. | |

(Continued)

FOREIGN PATENT DOCUMENTS

| | | |
|---|---|---|
| WO | WO 2007/056744 | 5/2007 |
| WO | WO 2007/076507 | 7/2007 |

OTHER PUBLICATIONS

4FRONT, Photographs of Draft Pad with Foam Blocks taken at Gordon Foods; Installed and in public view on Mar. 12, 2008; 3 pages [4FES0001-4FES0003].

(Continued)

*Primary Examiner* — Gary Hartmann
(74) *Attorney, Agent, or Firm* — Perkins Coie LLP

(57) ABSTRACT

Dock leveler sealing systems are disclosed herein. In various embodiments, a dock leveler sealing system can include a bottom seal configured to be attached to an underside of a dock leveler deck and extend transversely thereto, and two side seals configured to be attached to opposite end portions of the bottom seal and extend forwardly therefrom. The side seals can be shaped and sized to effectively seal openings and/or gaps that may exist between the bottom seal, the deck lip, a shipping vehicle, a dock bumper, and/or the building floor.

13 Claims, 10 Drawing Sheets

(56) References Cited

U.S. PATENT DOCUMENTS

| | | |
|---|---|---|
| 2008/0052843 A1 | 3/2008 | Eungard et al. |
| 2009/0077906 A1 | 3/2009 | Tramonte, Jr. et al. |
| 2009/0126130 A1* | 5/2009 | Bettendorf et al. ............ 14/71.5 |
| 2010/0031457 A1 | 2/2010 | Gleason et al. |
| 2010/0146876 A1 | 6/2010 | Eungard |
| 2010/0186318 A1 | 7/2010 | Eungard |
| 2010/0319143 A1 | 12/2010 | Wessel |
| 2011/0047725 A1 | 3/2011 | Story et al. |

OTHER PUBLICATIONS

4FRONT; Photographs taken at Gordon Foods, Brighton, MI.; in public view Jan. 25, 2008; 4 pages [4FES0004-4FES0007].

4FRONT, Photographs of Target Installation; in public view Dec. 9, 2010; 4 pages [4FES0008-4FES0011].

4FRONT, "Target—Cedar Falls, IA: BP-1 Custom Bottom Pad for Vertical Leveler"; Drawing No. Target—Cedar Falls—Custom—BP, dated Nov. 29, 2010; 1 page [4FES0012].

4FRONT Engineered Solutions, "McEntire Produce/SE Dock and Door Custom Bottom Pad"; Drawing No. McEntire Custom Bottom Pad, dated Sep. 18, 2009; p. 1 [4FES0013].

4FRONT Engineered Solutions, "McEntire Produce Bottom Pad Concept Drawing"; Drawing No. McEntire Produce Concept; dated Jul. 2, 2007; 1 page [4FES0014].

4FRONT Engineered Solutions, "Drawing: Target—Cedar Falls, IA Vertical Board Bumper Cover Pad"; Drawing No. Target—VB Bumper Cover Pad Magnetic; dated Dec. 2, 2010; pp. 1-2 [4FES0015-4FES0016].

4FRONT, "Publix Bottom Pad Assembly Drawing"; Drawing No. PUBLIX BP—Assembly, Revision B; dated Mar. 21, 2003, 1 page [4FES0017].

4FRONT Engineered Solutions, "Drawing of Custom Bottom Pad for Gordon Food Service", Revision B; dated Feb. 4, 2008, 1 page [4FES0018].

Frommelt; VHLS Vertical Under—leveler Seal (Model VHLS-0003); dated Mar. 2007; 16 pages [4FES0019-4FES0034].

Frommelt; "Frommelt®VHLS Under—lever Seal for Vertical Hydraulic Leveler"; Rite Hite; printed on Aug. 28, 2007, 1 page, found online at http://www.ritehite.com/ark/rhweb/rhprod.nsf/se/VHLS+Under—Leveler+Seal [4FES0035].

Frommelt® "VHL Under—leveler Seal (Model VHLS): Architectural Specifications"; date unknown; pp. 1-2 (document incorrectly states pages 1 of 3); reviewed online on Dec. 30, 2011 at: http://www.ritehite.com/content/literature/585.pdf [4FES0036-4FES0037].

Frommelt® Products Corp.; "Architectural, Approval Drawing Standard and Jumbo VHL Under Under Leveler Seal"; Drawing No. A7120075, Initial ECM: 05-023, date issued: Oct. 12, 2005, dated Oct. 24, 2005; 1 page [4FES0038].

Frommelt® Products Corp.; "Under Leveler Seal for Levelers with Sloped Toe Guards Architectural Approval"; dated May 22, 2000; Drawing No. A7160006, Revision C,; 1 page [4FES0039].

McEntire Pad Pictures 1-10; dated Jul. 2, 2007 [4FES0040-4FES0049].

Multi-Fab Products, LLC; "DLC Dock Leveler Curtain Specifications", dated Jun. 8, 2010 per website at: http://www.multi-fab.com/comp_dock_leveler_curtainlights123.html, 2 pages [4FES0050-4FES0051].

Serco; "Dock Seal Installation Instruction for Publix"; dated Nov. 8, 1994; 1 page [4FES0052].

* cited by examiner

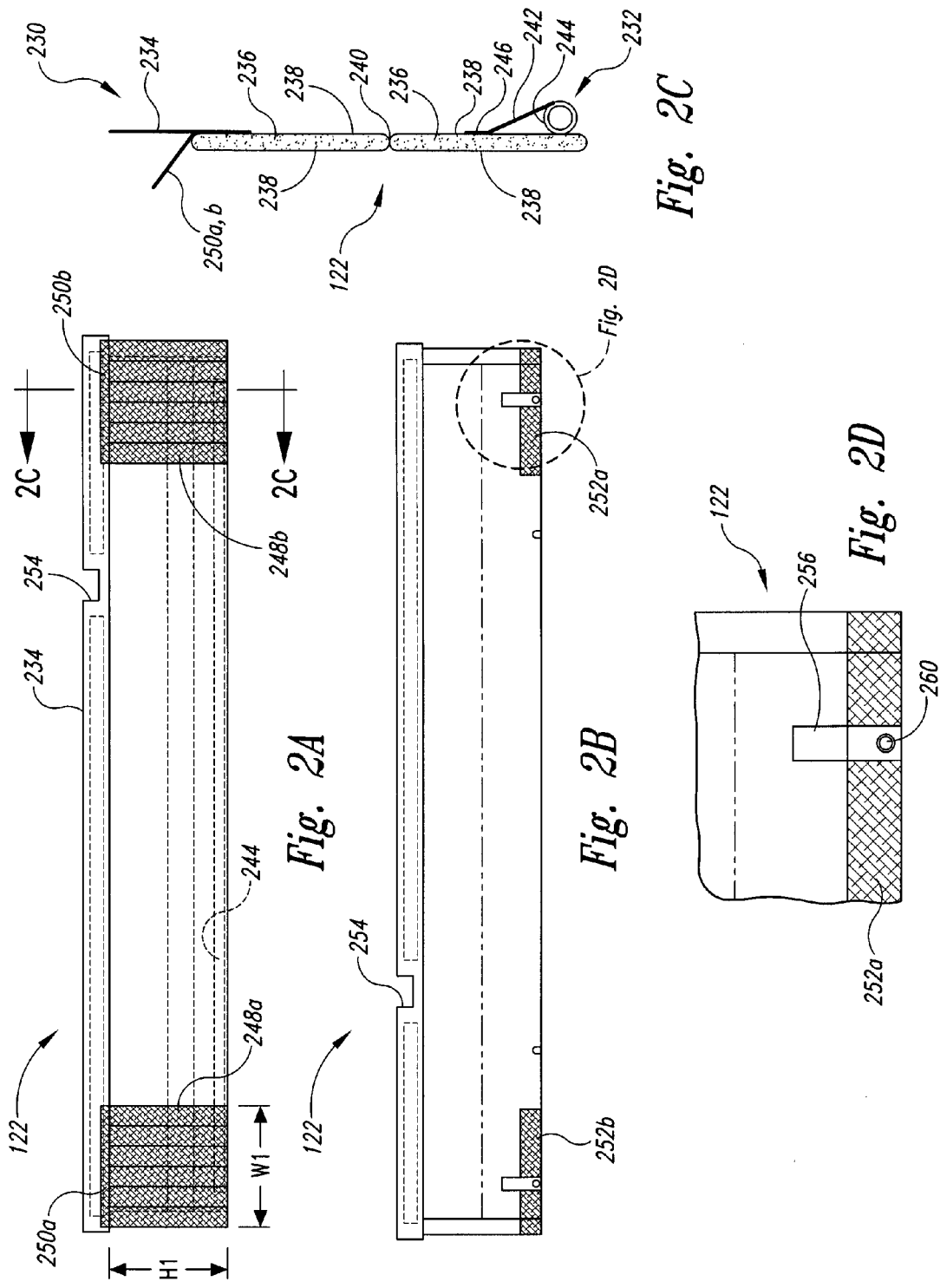

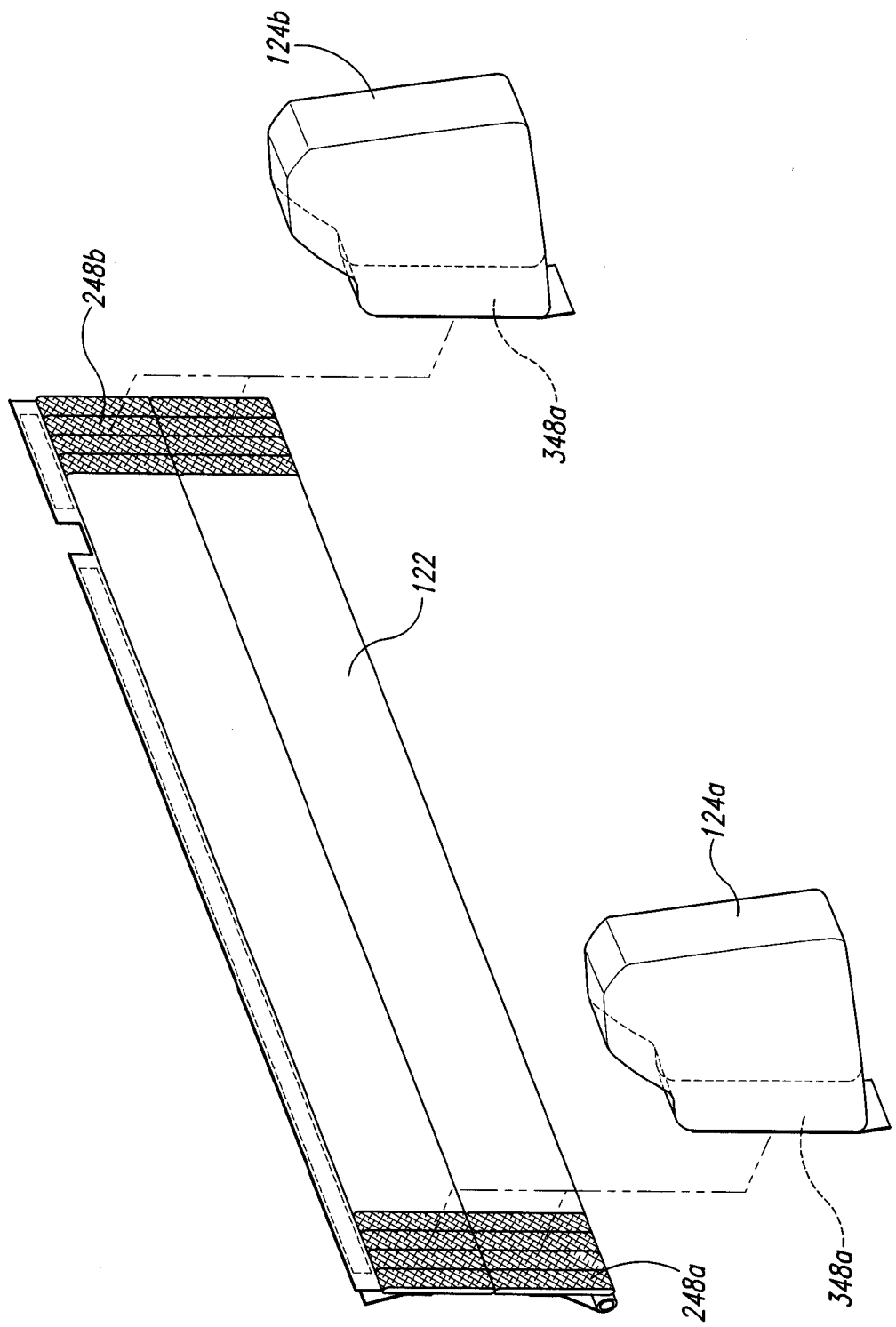

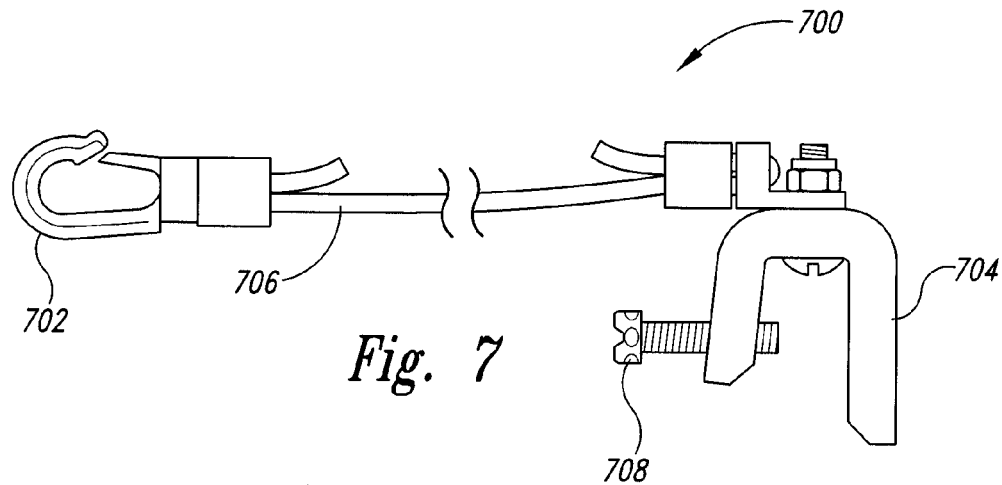
Fig. 7
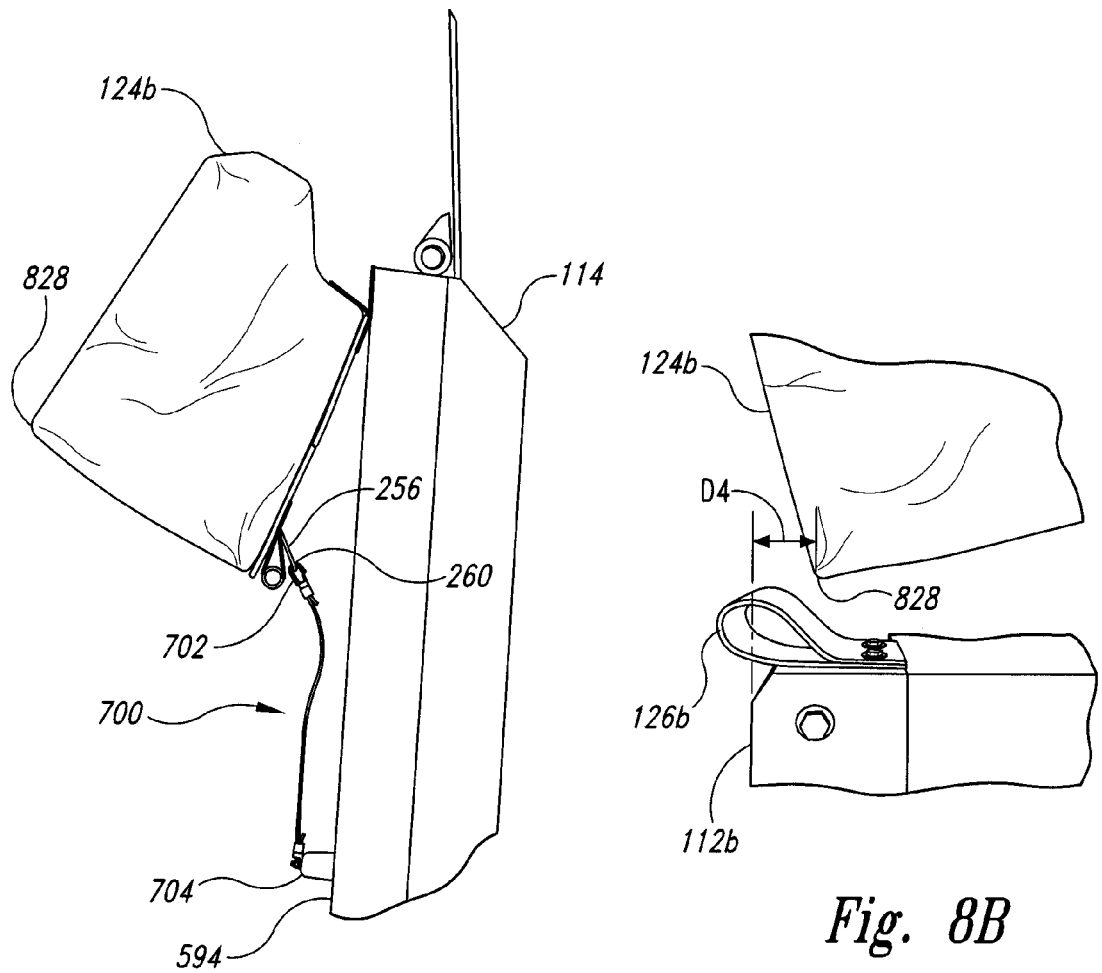
Fig. 8A
Fig. 8B

DOCK LEVELER SEALING SYSTEMS

TECHNICAL FIELD

The present disclosure relates generally to systems for sealing gaps between a dock leveler, a loading dock, and/or a shipping vehicle.

BACKGROUND

Warehouses, manufacturing facilities, and large retail outlets typically include one or more loading docks for transferring goods to and from trucks, trailers, and other shipping vehicles. Conventional loading docks usually consist of an opening in an exterior wall of the building. The opening is typically positioned a few feet above the ground so that it is approximately level with the bed of shipping vehicle, and is usually covered by a sectional door.

Some loading docks include a dock leveler with a movable deck or ramp to adjust for any misalignment between the floor of the loading dock and the bed of the trailer. Vertical dock levelers are, as the name implies, stored in a generally vertical position when not in use, while horizontal dock levelers are stored in a lowered and generally horizontal position. With either type of leveler, the aft edge of the ramp is typically attached to a hinge structure mounted to the floor of the loading dock or to the rear wall of a deck pit formed in the floor. The forward edge of the ramp typically carries a pivoting lip extends outwardly to engage the trailer bed for use.

To transfer goods to or from a trailer, the rear doors on the trailer are opened and the trailer is backed up to the loading dock opening. With the trailer in position and the loading dock door raised, horizontally stored decks first pivot upwardly about the rear hinge to allow the lip to extend, and then downwardly toward the open end of the trailer until the lip comes to rest on the bed. Vertically stored decks simply rotate downwardly about the rear hinge as the lip extends outwardly and ultimately comes to rest on the trailer bed. Workers, fork lifts, etc. can then move into and out of the trailer to load and/or unload cargo. As cargo is moved into or out of the trailer, the dock leveler moves up or down as needed to accommodate any vertical movement of the trailer bed relative to the building floor. Various types of dock levelers and associated features are disclosed in, for example, U.S. Pat. Nos. 5,475,888, 6,125,491 and 7,216,392, each of which is incorporated herein in its entirety by reference.

Gaps can form around the top and sides of the trailer and the loading dock opening when the trailer is in position and the loading dock door is open. These gaps can allow conditioned air to exit the building or the trailer, and/or allow undesirable elements (e.g., rain, snow, warm/cold outside air, debris, insects, etc.) to enter the building or the trailer, resulting in energy losses, undesirable working conditions, spoiled goods, and/or other deleterious effects. For this reason, many loading docks include a compressible dock seal or a shelter that extends around the top and sides of the loading dock opening to seal gaps that may exist between the aft end of the trailer and the dock opening. Examples of such sealing structures are disclosed in, for example, U.S. patent application Ser. No. 11/860,468, filed Sep. 24, 2007, and entitled "LOADING DOCK TRUCK SHELTERS," U.S. patent application Ser. No. 12/360,082, filed Jan. 26, 2009, and entitled "LOADING DOCK TRUCK AND TRAILER SEALS AND ASSOCIATED SYSTEMS AND METHODS," and U.S. patent application Ser. No. 12/334,167, filed Dec. 12, 2008, and entitled "SEGMENTED DOCK SEALS FOR TRUCK LOADING DOCKS AND ASSOCIATED SYSTEMS AND METHODS," each of which is incorporated herein in its entirety by reference.

Undesirable leak paths can also exist beneath and around deployed dock levelers. Gaps may exist, for example, between the sides of the deck lip and the trailer bumpers positioned on opposite sides of the loading dock opening. The area under the front of both horizontally stored and deployed decks can also create leak paths. Such leak paths can allow outside air and debris to flow under the front of the deck and pass upwardly into the building through gaps between the rear and side edges of the deck and the adjacent pit walls. Various types of seals have been used around and beneath the deck to seal these leak paths. Such seals are disclosed in, for example, U.S. Pat. Nos. 8,046,857 and 7,594,290, each of which is incorporated herein in its entirety by reference.

BRIEF DESCRIPTION OF THE DRAWINGS

FIGS. 2A-2D are a series of front, rear, side cross-sectional, and enlarged views, respectively, of an dock leveler bottom seal configured in accordance with an embodiment of the present disclosure.

FIGS. 6A-6C are a series of isometric views illustrating various stages in a method for installing two of the side seal shown in FIG. 3D on the bottom seal of FIGS. 2A-2D in accordance with an embodiment of the present disclosure.

FIG. 7 is a side view of a tether assembly configured in accordance with an embodiment of the present disclosure.

FIGS. 8A and 8B are side views of a dock leveler illustrating various stages in a method for installing and adjusting the tether of FIG. 7 on the sealing system of FIG. 5B in accordance with an embodiment of the present disclosure.

DETAILED DESCRIPTION

The following disclosure describes various embodiments of dock leveler sealing systems and associated methods of manufacture and use. Certain details are set forth in the following description and in FIGS. 1-9 to provide a thorough understanding of various embodiments of the present technology. In other instances, well-known structures, materials, operations and/or systems often associated with dock levelers, dock leveler seals, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. In a similar regard, many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

Figure 1:
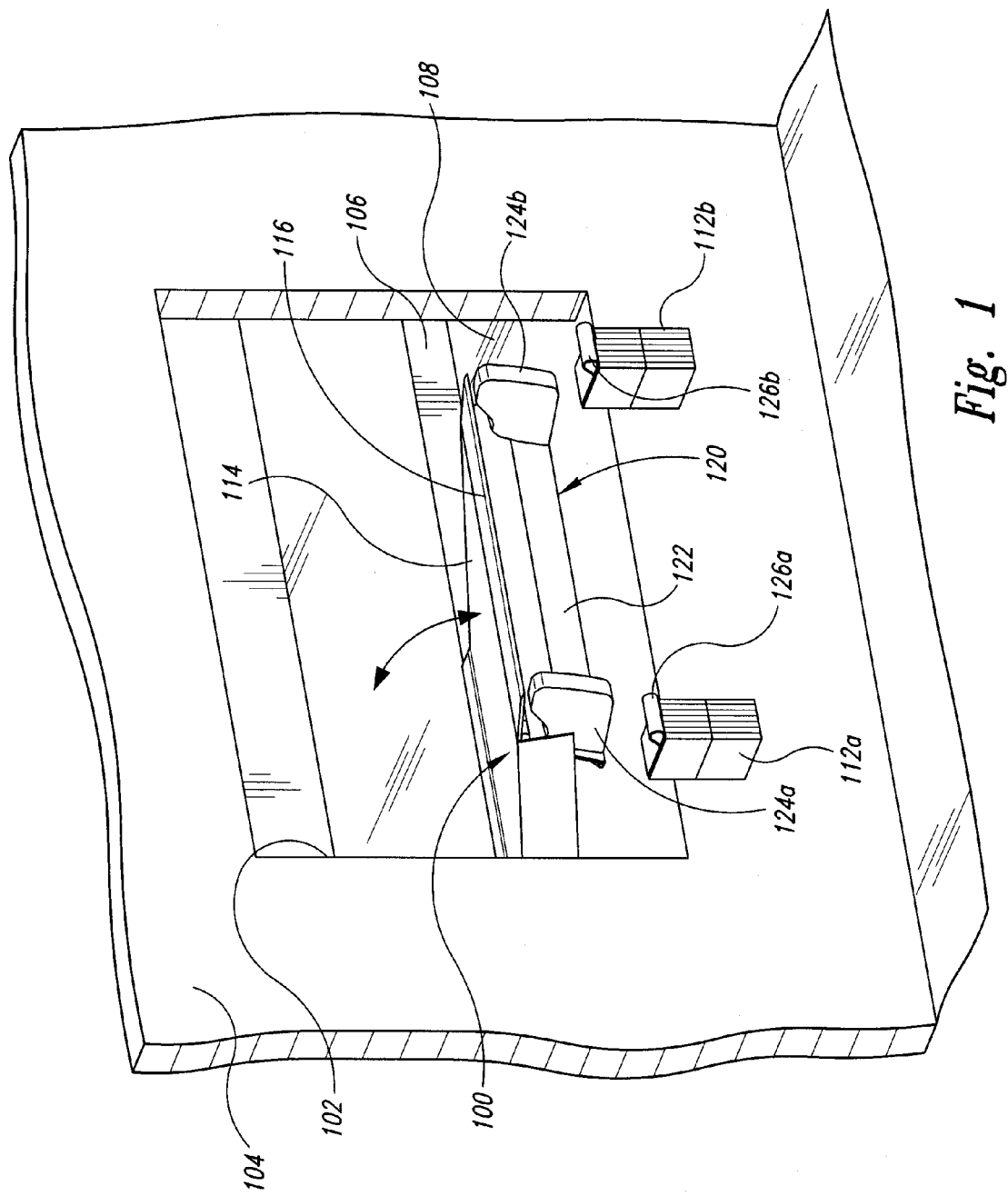
FIG. 1 is an isometric view of a dock leveler having a sealing system configured in accordance with an embodiment of the present disclosure.

FIG. 1 is an isometric view of a dock leveler system 100 having a sealing system 120 configured in accordance with an embodiment of the present disclosure. The dock leveler system 100 is installed in an opening 102 of a warehouse or other building 104. In the illustrated embodiment, the dock leveler system 100 includes a deck 114 having an aft edge portion hingedly attached to a back wall 106 of a lower floor 108 (e.g. a pit floor) by a suitable mounting frame in a known manner. A pivoting deck lip 116 extents outwardly from a forward edge portion of the deck 114 to contact the bed of a trailer or other shipping vehicle for loading and/or unloading the vehicle. Although the dock leveler system 100 depicted in FIG. 1 may be a vertically-stored dock leveler, the various sealing systems described herein are equally usable with other types of dock leveler systems, including horizontally stored dock levelers.

In one aspect of this embodiment, the sealing system 120 is operably coupled to an underside portion of the deck 114 proximate the lip 116. The sealing system 120 includes a main or bottom sealing pad or bottom seal 122 extending transversely proximate the forward edge portion of the deck 114, and two side sealing pads or side seals 124 (identified individually as a first side seal 124a and a second side seal 124b) projecting forwardly from opposing end portions of the bottom seal 122. As described in greater detail below, in the illustrated embodiment each of the side seals 124 is configured to rub against a corresponding bumper seal 126 (identified individually as a first bumper seal 126a and a second bumper seal 126b) mounted to an adjacent dock bumper 112 (identified individually as a first dock bumper 112a and a second dock bumper 112b) as the deck 114 rotates downwardly into the deployed position. When the deck 114 is fully lowered so that the lip 116 is resting on the bed of a trailer, the side seals 124 can effectively seal potential leak paths that may otherwise exist between the underside of the deck lip 116, the bottom seal 122, the floor surface 108, and the back of the parked trailer (not shown).

Although not shown in FIG. 1, the various embodiments of the under-dock sealing systems described herein are intended to be used in conjunction with a suitable trailer sealing system known in the art. Such trailer sealing systems are configured to seal potential gaps that may otherwise exist into or out of the open end of the trailer and/or the interior of the building 104. Some such sealing systems include compressible top and side seal pads which are mounted to the outer wall of the building 104 around the top and side edges, respectively, of the opening 102. When the open trailer backs into the loading dock, the trailer contacts and compresses the top and side seal pads to form a seal. In other embodiments, the loading dock can include a shelter-type seal which encloses the aft end of the trailer to seal the aft end of the trailer with respect to the building 104. Suitable close-out pads can also be positioned in the lower corners of the opening 102 to supplement the sealing provided by a shelter-type trailer seal or and/or other types of seals. Various examples of dock seals and shelters are disclosed, for example, in U.S. patent application Ser. Nos. 11/860,468, 12/360,082, and 12/334,167 which, as set forth above, are incorporated herein in their entireties by reference.

FIGS. 2A and 2B are front and rear views, respectively, of the bottom seal 122 configured in accordance with an embodiment of the present disclosure, and FIG. 2C is an enlarged cross-sectional side view of the bottom seal 122 taken substantially along line 2C-2C in FIG. 2A. Referring to FIGS. 2A-2C together, the bottom seal 122 has a generally elongate rectangular shape configured to extend the full width, or at least approximately the full width of the loading dock deck for which it is intended to be used. The bottom seal 122 includes a proximal end portion 230 having an edge portion 234 configured to be attached to an underside of the deck, and a distal end portion 232 configured to contact a floor of the dock leveler pit when the dock leveler is in the lowered or deployed position. As shown in FIG. 2C, in the illustrated embodiment the bottom seal 122 is formed from one or more pads 236 (e.g., two foam pads 236) which are enclosed in a durable cover 238 (e.g., a woven vinyl-coated polyester fabric cover). The pads can have various thicknesses, ranging from about 0.08 inch to about 0.5 inch, or about 0.12 inch to about 0.25 inch. The cover 238 can enclose the pads 236 and be stitched together at a joint 240 that enables the bottom seal 122 to hingeably fold about the joint 240. Additional stitching can enclose the upper pad 236 within the cover 238 proximate the upper edge portion 234. As described in greater detail below, the upper edge portion 234 can be suitably fastened or otherwise attached to the underside of the deck (e.g., the deck 114 of FIG. 1) to hingeably or pivotally attach the bottom seal 122 to the deck. The upper edge portion 234 can also include a notch 254 or other feature to accommodate passage of a cylinder or other mechanism for extending the lip 116 as the deck 114 rotates into position.

In the illustrated embodiment, the bottom seal 122 further includes a sleeve 242 positioned proximate to the aft surface of the distal end portion 232. A proximal end portion 246 of the sleeve 242 formed by overlapping portions of sleeve material is stitched or otherwise suitably attached to the aft surface of the bottom seal 122. The sleeve 242 contains an elongate weight 244, such as an elongate metal tube that helps to hold the distal end portion 232 downwardly against the pit floor when the deck is in the lowered position. The bottom seal 122 can be at least generally similar in structure and function to various bottom seals disclosed in U.S. Pat. No. 7,594,290, which, as set forth above, is incorporated herein by reference in its entirety by reference.

In a further aspect of the illustrated embodiment, the bottom seal 122 includes a plurality of fastening features for attaching the side seals 124 to the front face of the bottom seal 122. For example, the bottom seal 122 can include a first fastening feature 248a positioned toward a first end portion, and a corresponding second fastening feature 248b positioned toward an opposite second end portion. In the illustrated embodiment, the fastening features 248 can include a portion of a suitable hook and loop type fastening system (e.g., Velcro®), such as the hook portion of a hook and loop type fastening system. The fastening features may come in tape form (e.g., 2 inch tape) that is applied in a series of strips to form an attachment region having a first height H1 and a first width W1. The first width W1 can be from about 8 inches to about 20 inches, or about 12 inches. The first height H1 can extend from the proximal end portion 230 of the bottom seal 122 to the distal end portion 232. In one embodiment, for example, the first height H1 can be from about 10 inches to about 24 inches, or about 15 inches. In other embodiments, however, the bottom seal 122 and/or the attachment regions 248 can have other heights and/or other widths.

As shown in FIG. 2B, the aft surface of the bottom seal 122 also includes a portion of the first fastening feature 248a and a portion the second fastening feature 248b which curl around the distal end portion 232 of the bottom seal 122 and extend partially up the backside for a distance of about 1 inch to about 4 inches, or about 2 inches, to form corresponding aft attachment regions 252a and 252b. Moreover, upper portions of the first fastening feature 248a and the second fastening feature 248b form corresponding flaps 250a and 250b which are hingedly attached to the bottom seal 122 proximate the upper edge portion 234. As described in greater detail below, the fastening features 248 attach to corresponding fastening features on the side seals 124 to suitably mount the side seals to the bottom seal 122 during assembly of the sealing system 120 (FIG. 1).

Turning next to FIG. 2D, in the illustrative embodiment each grommet tab 256 includes a grommet 260 installed in a distal end portion 232 thereof. As described in greater detail below, the grommet 260 is configured to receive a hook or other attachment feature on a distal end of a tether for controlling the fore and aft positions of the side seals 124 as the dock leveler is rotated downwardly into a deployed position.

Figure 3A:
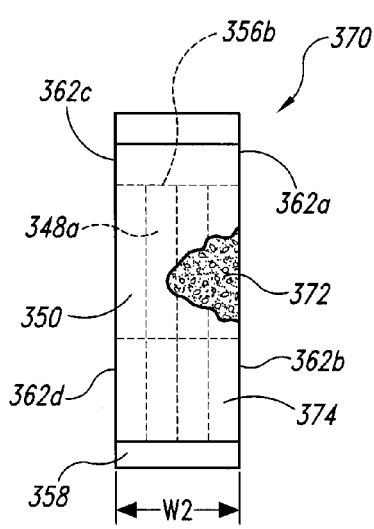
FIGS. 3A and 3B are front and side views, respectively, of a side seal sub-assembly configured in accordance with an embodiment of the present disclosure.
Figure 3B:
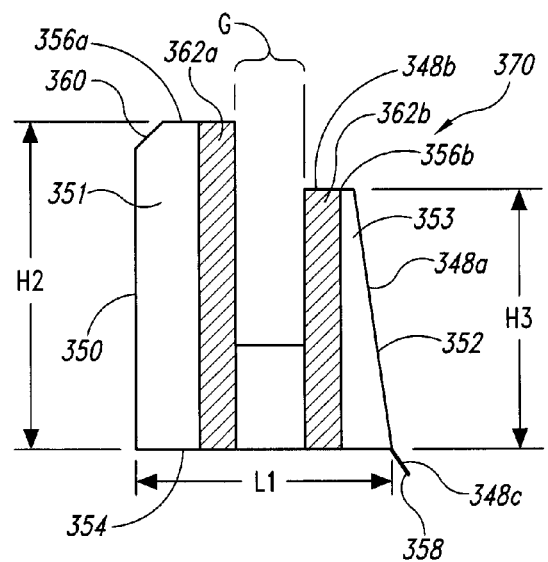

FIGS. 3A and 3B are front and side views, respectively, of a side seal sub-assembly 370 configured in accordance with an embodiment of the present disclosure. Referring to FIGS. 3A and 3B together, the side seal sub-assembly 370 is generally constructed from one or more pieces of a compressible core 372 (e.g., a compressible foam core) that is covered by a flexible and durable fabric 374 (e.g., a 22 oz. woven vinyl-coated polyester fabric) that can be stitched and/or bonded together to form a cover in a known manner. The cover can include one or more vent holes (not shown) to allow air, moisture, etc. to flow into and/or out of the side seal 124 during use. In the illustrated embodiment, the side seal sub-assembly 370 can have a second width W2 of from about 4 inches to about 24 inches, or about 8 inches; and a first length L1 along a lower or bottom surface 354 of from about 8 inches to about 24 inches, or about 15 inches.

As shown in FIG. 3B, the side seal sub-assembly 370 includes a forward or front "finger" 351 having a forward surface 350 extending between the bottom surface 354 and a first upper surface 356a. A beveled surface 360 extends between the forward surface 350 and the first upper surface 356a. The side seal sub-assembly 370 also includes an aft or rear finger 353 having a rear surface 352 extending upwardly from the bottom surface 354 to a second upper surface 356b.

In the illustrated embodiment, the first upper surface 356a is positioned at a second height H2 of from about 10 inches to about 30 inches, or about 19 inches above the bottom surface 354, and the second upper surface 356b is positioned at a third height H3 of from about 8 inches to about 20 inches, or about 15 inches above the bottom surface 354, so that the second upper surface 356b is stepped down somewhat relative to the first upper surface 356a.

The rear surface 352 extends upwardly at a slight angle relative to the bottom surface 354. This angle approximates the angle the bottom seal 122 assumes relative to the pit floor 108 as the deck 114 approaches a horizontal position. More specifically, the weight of the side sealing pads 124 cantilevered outwardly in front of the bottom seal 122 causes the bottom seal 122 to rotate slightly aft about its hinge point. As a result, the bottom seal 122 hangs at an angle less than 90 degrees relative to the pit floor 108. To accommodate for this angle, the rear surface 352 is canted slightly forward at an incline of from about 2 degrees to about 15 degrees, or about 5 degrees.

In another aspect of the illustrated embodiment, the front finger 351 is spaced apart from the rear finger 353 by a gap G which extends downwardly a portion of the distance toward the bottom surface 354. In some embodiments, for example, the bottom surface of the gap G can be positioned at a distance of from about 3 inches to about 9 inches, or about 6 inches above the bottom surface 354. A first fastening feature 362a (e.g., a strip of hook material for a hook and loop fastening system; shown by cross-hatch in FIG. 3B) is stitched, bonded or otherwise attached to the side seal sub-assembly 370 along the front side of the gap G, and a similar second fastening feature 362b is attached to the side seal sub-assembly 370 along the rear side of the gap G. Similar fastening features exist in corresponding positions on the opposite side of the side seal sub-assembly 370 adjacent to the gap G.

A releasable fastening feature 348a (e.g., a plurality of 2 inch wide strips of hook material from a hook and loop type fastening system) can be sewn, bonded, or otherwise attached to the rear surface 352. Similar fastening features 348b and 348c (e.g. additional portions of hook material) can be similarly attached to the second upper surface 356b and to the back side of a lower flap 358, respectively.

Figure 3C:
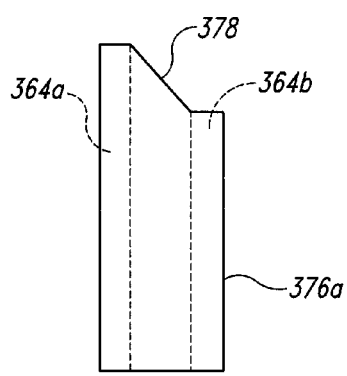
FIG. 3C is a side view of a side seal cover.

FIG. 3C illustrates a side view of a first side panel cover 376a configured in accordance with an embodiment of the present disclosure. A second side panel cover (not shown) can be generally a mirror image of the first side panel cover 376a. In the illustrated embodiment, the side panel cover 376a has a shape that approximates the shape bounded by the first and second fastening features 362 which extend vertically on the side surfaces of the side seal sub-assembly 370, the adjacent portion of the bottom surface 354, and the adjacent portions of the upper surfaces 356a and 356b. The side panel cover 376a also includes an angled edge portion 378 that is configured to span the gap G and approximately match the line from the rear corner of the front finger 351 to the front corner of the rear finger 353 and (FIG. 3B). In addition, the backside of the side cover 376a includes a third fastening feature 364a (e.g., a strip of hook material) and a similar fourth fastening feature 364b. The first and second fastening features 364 of the side cover 376 are positioned to align with the corresponding fastening features 362 on the side surface of the side seal sub-assembly 370.

Figure 3D:
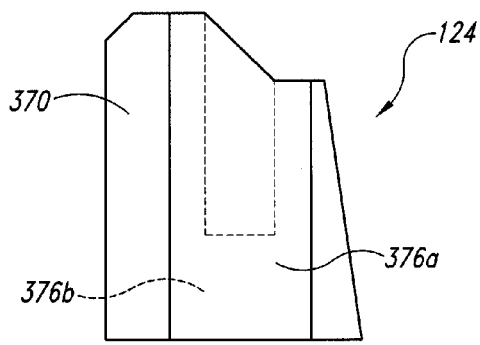
FIG. 3D is a side view of a side seal composed of the side seal sub-assembly of FIGS. 3A and 3B and the side seal cover of FIG. 3C.

Turning next to FIG. 3D, to fully assemble the side seal 124 in accordance with the illustrated embodiment, the first side cover 376a is positioned against the first side of the side seal sub-assembly 370 so that the corresponding fastening features 362 and 364 overlay and attach to each other, and an opposite second side cover (not shown) having the same shape is similarly attached to the opposite side surface of the side seal sub-assembly 370. Because the outboard side cover 376 on each side seal 124 contacts the inboard side surface of the dock bumper 112 and the dock bumper seal 126 during operation, the side cover fabric can become worn over time. However, the releasable fastening features described above enable the side covers 376 to be easily replaced when worn. As described in greater detail below, the shape, dimensions, and/or other features of the side seal sub-assembly 370 enable the side seal sub-assembly to effectively seal the area beneath the dock leveler lip, the trailer, and the pit floor when the dock leveler is in the lowered and deployed position.

Figure 4A:
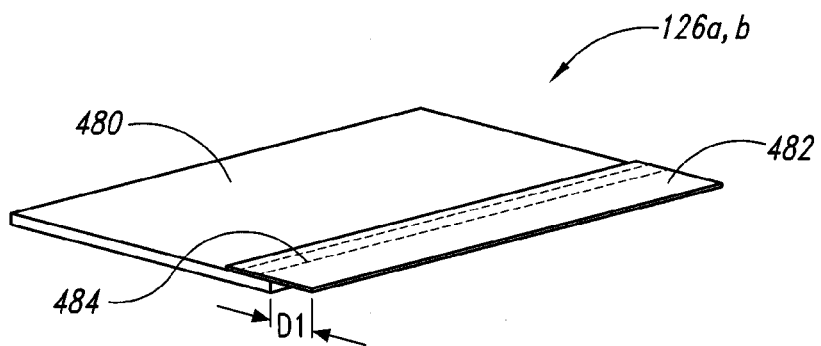
FIGS. 4A and 4B illustrate two stages in a method for manufacturing a bumper seal in accordance with an embodiment of the present disclosure.
Figure 4B:
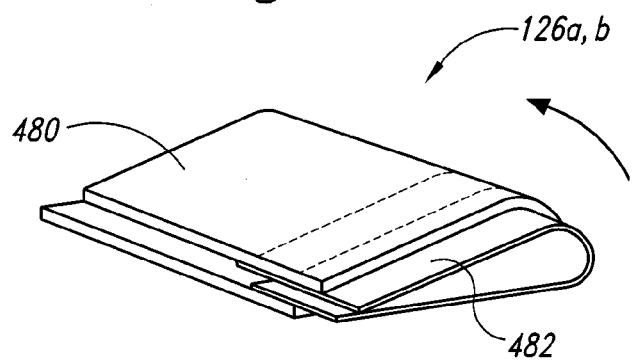

FIGS. 4A and 4B are a series of isometric views illustrating various stages in a method of manufacturing the bumper seals 126 shown in FIG. 1 in accordance with an embodiment of the present disclosure. In the illustrated embodiment, both of the bumper seals 126a and 126b are formed in generally the same way and, accordingly, may be referred to herein as "the bumper seal 126." More specifically, the bumper seal 126 of this embodiment can be formed by suitably attaching a sealing strip 482 (e.g., a flexible and resilient flat rubber strip) to an edge portion of a slightly thicker bumper cover 480 (e.g., a sheet of flexible and resilient material, such as rubber, vinyl, etc.). The outer edge of the sealing strip 482 can by offset a distance D1 away from the adjacent edge of the bumper cover 480, and can be attached to the bumper cover 480 by stitching 484 and/or adhesively bonding overlapping portions of the two parts together, and/or by other suitable methods known in the art. In the illustrated embodiment, the distance D1 can be from about 0.5 inch to about 3 inches, or about 1 inch. As shown in FIG. 4B, after the sealing strip 482 is suitably attached to the bumper cover 480, the bumper cover/sealing strip combination is folded so that the opposite end portions overlay each other.

Figure 4C:
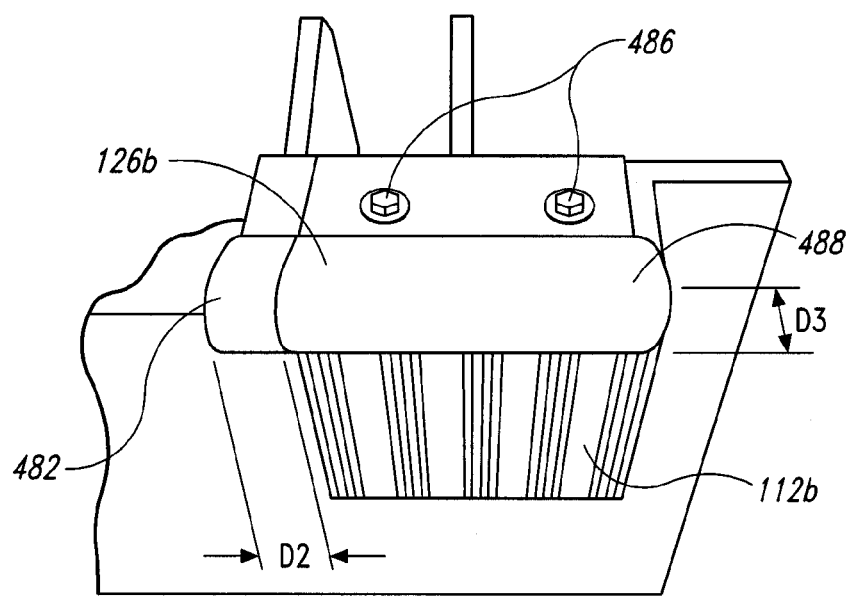
FIG. 4C is an isometric view showing the bumper seal of FIGS. 4A and 4B installed on a loading dock bumper in accordance with another embodiment of the present disclosure.

FIG. 4C is a top front isometric view illustrating a method of attaching the second bumper seal 126b to the second bumper 112b of FIG. 1 in accordance with an embodiment of the present disclosure. In the illustrated embodiment, the second bumper seal 126b is first positioned so that the sealing strip 482 overhangs the dock leveler side of the bumper 112b by a second distance D2, and a front fold 488 overhangs the bumper face by a third distance D3. In one embodiment, for example, the second distance D2 can be from about 0.5 inch to about 2 inches, or about 1 inch, and the third distance D3 can be from about 0.5 inch to about 4 inches, or about 2 inches. Once the bumper seal 126b has been appropriately located, it can be attached to the top surface of the bumper 112b with one or more suitable fasteners 486 (e.g., screws), adhesive, etc.

Although the bumper seal 126 of the illustrated embodiment is made from material that is folded in half and fastened to the top surface of a dock bumper in such a way as to create a loop projecting beyond the face of the bumper, in other embodiments suitable bumper seals configured in accordance with the present disclosure can be made from other materials in other ways. For example, in other embodiments all or portions of a suitable bumper seal can be manufactured from compressible foam material, and/or from extruded materials, such as extruded foam or rubber. In addition, although the sealing strip 482 of the illustrated embodiment may be a more flexible and softer material than the bumper cover 480, in other embodiments the separate side sealing strip 482 can be omitted and functionally replaced by a portion of the bumper cover 480.

Figure 5A:
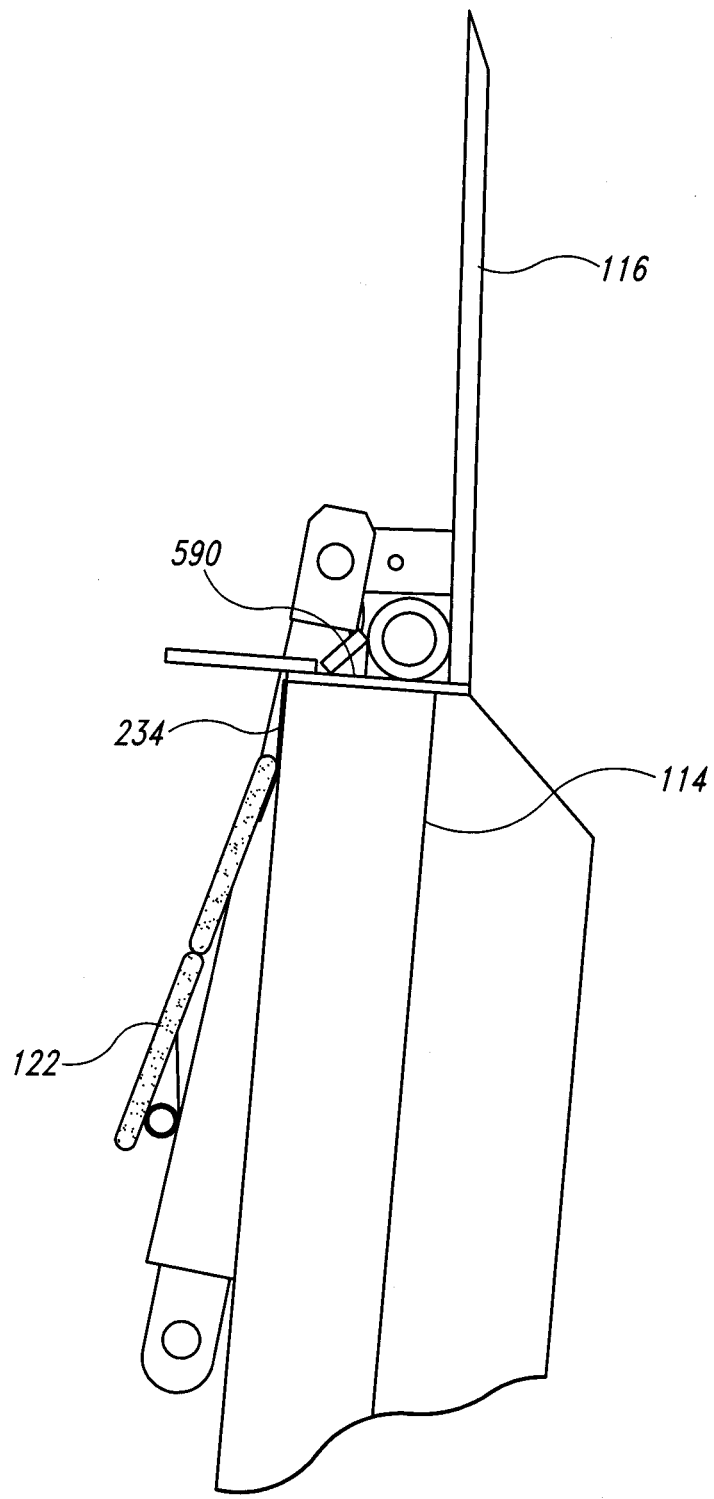
FIG. 5A is a side view of a bottom seal installed on a vertical dock leveler in accordance with an embodiment of the present disclosure.

FIG. 5A is an enlarged side view illustrating attachment of the upper edge portion 234 of the bottom seal 122 to the underside of the deck 114 in accordance with an embodiment of the present disclosure. In FIG. 5A, the deck 114 and corresponding deck lip 116 are in a vertical position (e.g., a stored position). In this embodiment, the upper edge portion 234 is positioned in edge contact with, or at least proximate to, a deck header bar 590 so that the bottom seal 122 hangs pendent therefrom.

Figure 5B:
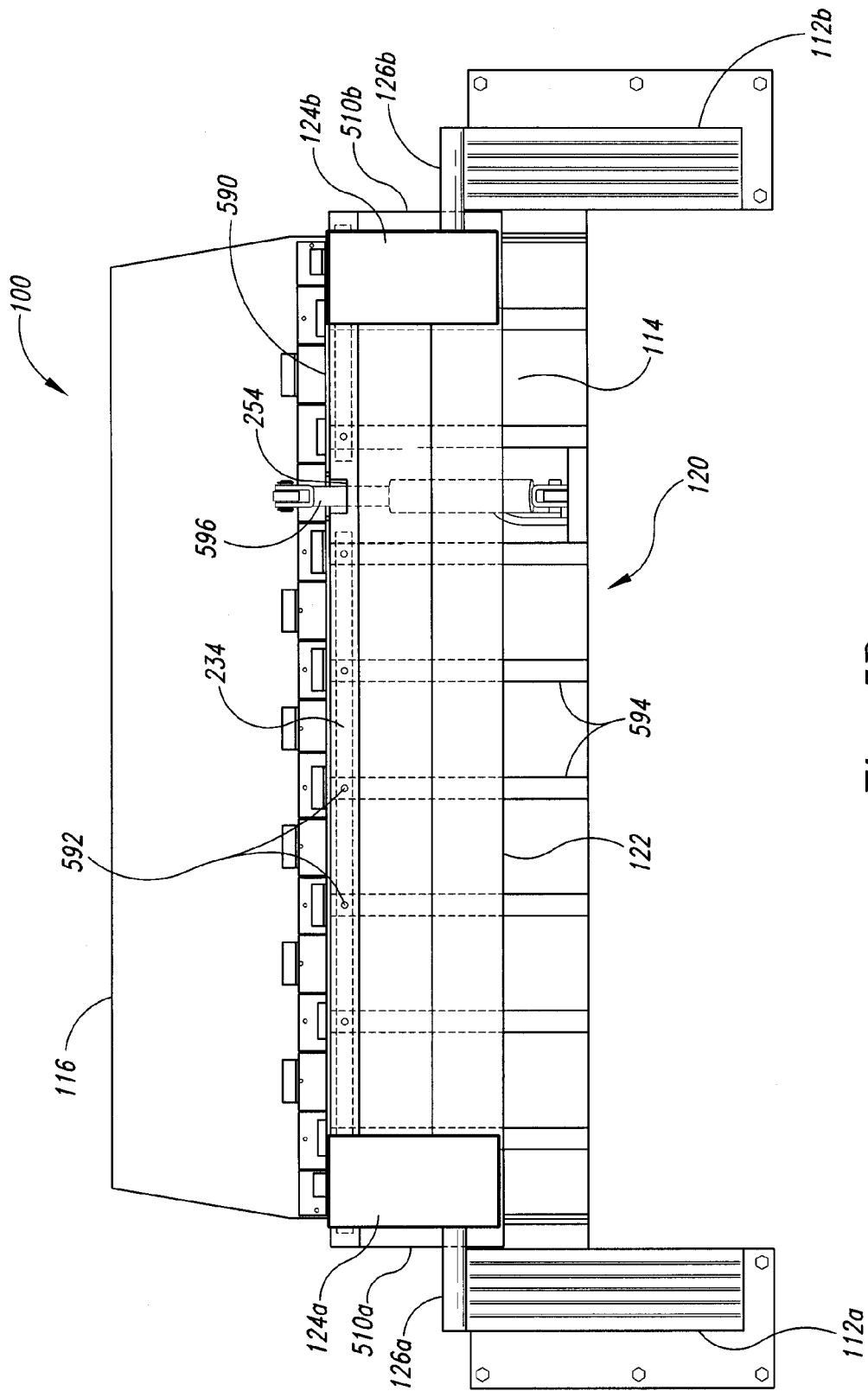
FIG. 5B is a front view of a sealing system installed on the dock leveler in a partially raised position in accordance with another embodiment of the present disclosure.

FIG. 5B is a front view illustrating attachment of the sealing system 120 to the dock leveler system 100 in accordance with an embodiment of the present disclosure. The bottom seal 122 should be located side-to-side such that opposing side edges 510a and 510b just contact the inboard side surfaces of the adjacent dock bumpers 112a and 112b when the deck 114 is lowered into position. The upper edge portion 234 of the bottom seal 122 is positioned so that the notch 254 provides clearance for a lip lifting mechanism or actuator 596 (e.g., a hydraulic cylinder). In the illustrated embodiment, a plurality of fasteners 592 (e.g., screws, such as ¼ inch Tek screws) are installed through the upper edge portion 234 of the bottom seal 122 to secure the upper edge portion 234 to a series of deck beams 594 proximate the header bar 590.

Figure 6B:
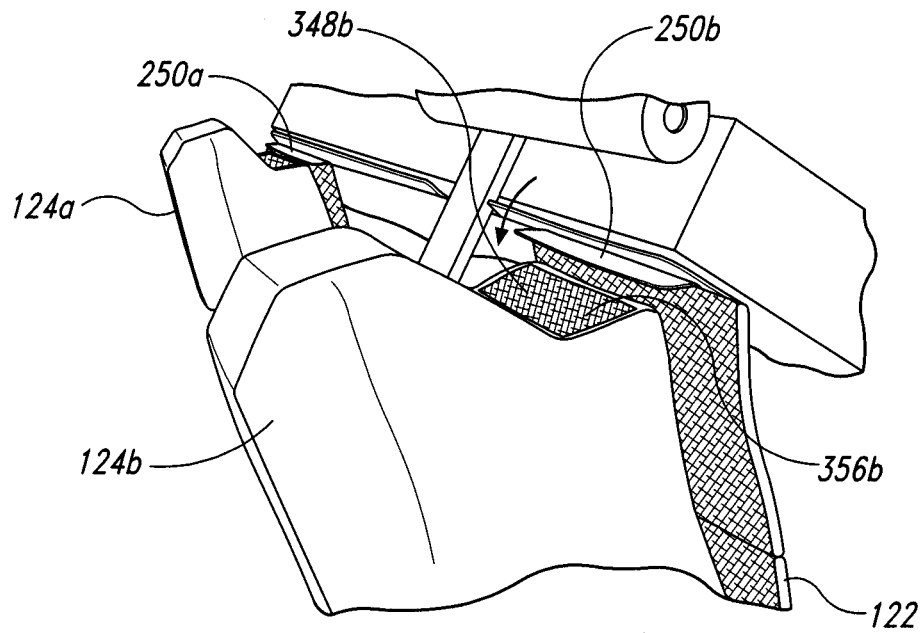
Figure 6C:
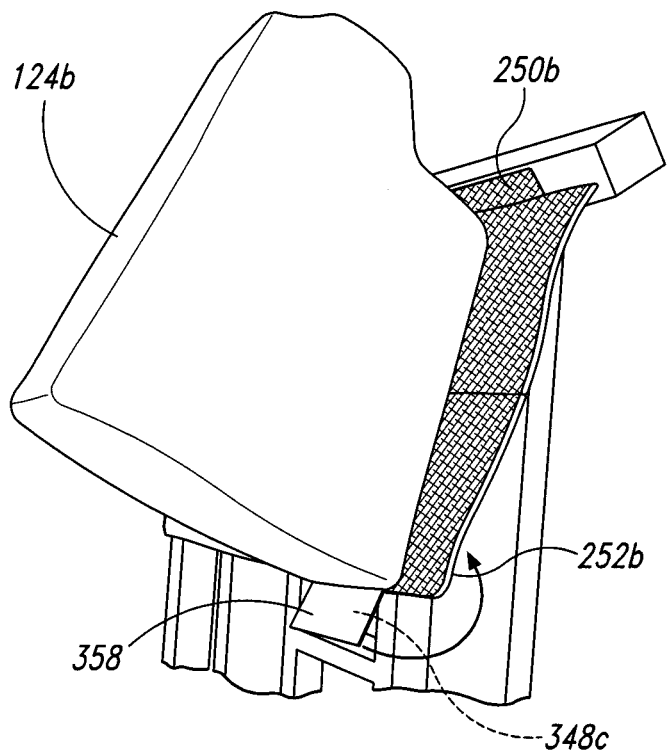

FIGS. 6A-6C are a series of isometric views illustrating various stages in a method for assembling the under-deck sealing system 120 in accordance with an embodiment of the present disclosure. Referring first to FIG. 6A, the side seals 124a and 124b are attached to the bottom seal 122 by pressing the releasable fastening features 348a on the rear surfaces of the side seals 124 against the releasable fastening features 248 attached to the front surface of the bottom seal 122. For example, if the releasable fastening features 248 and 348 include corresponding portions of a hook and loop type fastener (e.g., corresponding portions of Velcro™) then the side seals are releasably attached to the bottom seal 122 by simply pressing the Velcro™ strips together in a known manner. In other embodiments, the side seals 124 can be attached to the bottom seal 122 using other suitable methods and systems known in the art, including other fastening systems such as snaps, stitching, adhesive, etc. Returning momentarily to FIG. 5B, when the side seals 124 are correctly positioned on the bottom seal 122, each of the respective side seals 124 should be inset approximately one inch away from the adjacent side edge 510 of the bottom seal 122 so that the outer side surface of each side sealing pad 124 just contacts the adjacent inner edge of the sealing strip 482 (FIG. 4C) on the corresponding bumper seal 126 when the deck 114 is lowered into position.

Once the side seals 124 have been properly positioned on the bottom seal 122, the releasable fastening features on the upper flaps 250 of the bottom seal 122 are folded downwardly against the corresponding releasable fastening features 348b on the second upper surfaces 356b as shown in FIG. 6B. In addition, the releasable fastening features 348c on the backside of the lower flaps 358 are folded rearward around the lower edge portion of the bottom seal 122 and compressed against the corresponding releasable fastening features 252 on the backside of the bottom seal 122 (FIG. 2B). Attaching the rear surface 352, the second upper surface 356b, and the lower flap 358 of each side seal 124 to the bottom seal 122 creates a secure and durable connection between the side sealing pads 124 and the bottom pad 122.

FIG. 7 is a side view of an elastic lanyard or tether assembly 700 configured in accordance with an embodiment of the present disclosure. The tether assembly 700 includes a snap hook 702 fixedly attached to a first end of an elastic or resilient cord 706 (e.g., a bungee cord). A clamp or other suitable fitting 704 is fixedly attached to the opposite end of the cord 706. In the illustrated embodiment, the fitting 704 can include a relatively simple channel or U-shaped body with a clamping feature 708 (e.g., a threaded bolt) for securing the fitting 704 to a beam or other structure on the underside of a dock leveler deck.

FIGS. 8A and 8B illustrate further stages in a method for installing the sealing system 120 on the dock leveler deck 114 in accordance with an embodiment of the present disclosure. As shown in FIG. 8A, tether assembly 700 is attached to the backside of the bottom seal 122 by inserting the snap hook 702 through the grommet 260 on the grommet tab 256. The fitting 704 is then secured to the underside of the deck 114 (e.g., to a deck beam 594) a distance aft of the bottom seal 122 by tightening the clamping feature 708 (FIG. 7). The dock leveler deck 114 is then rotated downwardly from the vertical position until a bottom front corner 828 of each side seal 124 is approximately positioned shown in the FIG. 8B. At this time, the deck 114 is stopped and the fore and aft position of the tether fitting 704 (FIG. 7) on the corresponding deck beam 594 is adjusted so that the bottom front corner 828 of each side seal 124 is positioned a distance D4 away from the front face of the corresponding dock bumper 112. In one embodiment, for example, the offset distance D4 can be from about 1 inch to about 4 inches, or about 2 inches. Once the tether assembly 700 has been adjusted in the foregoing manner, the clamping feature 708 can be tightened to hold the fitting 704 in the desired location. In other embodiments, the tether 700 can be omitted and suitable weights can be added to the front lower corners of the side seals 124 to bias the bottom seal 122 rearward in the desired position.

Figure 9:
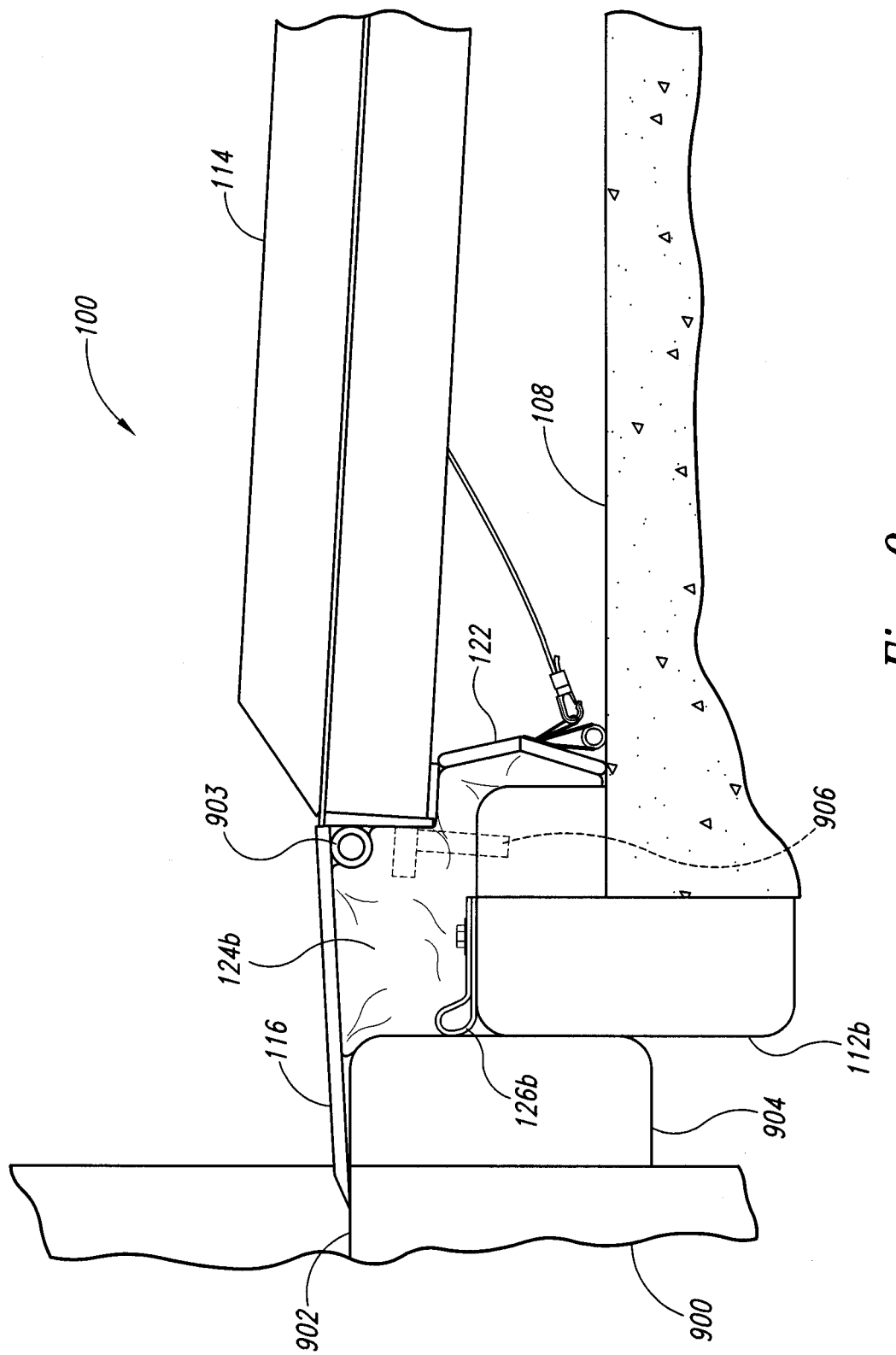
FIG. 9 is a side view of a deployed dock leveler having a sealing system configured in accordance with an embodiment of the present disclosure.

FIG. 9 is a side view of the dock leveler system 100 in an operating position in accordance with an embodiment of the present disclosure. A vehicle 900 (e.g., a shipping trailer) backs up to the loading dock so that its rear bumper 904 contacts the dock bumpers 112. The dock leveler deck 114 rotates downwardly and the lip 116 extends outwardly before coming to rest on a bed 902 of the vehicle 900. In this position, the bottom seal 122 contacts and generally seals against the pit floor 108, and each of the side seals 124 effectively seals the openings and/or gaps defined by the underside of the deck lip 116, the vehicle bumper 900, the dock bumper 112, and the pit floor 108.

The side profile or shape of the side sealing pads 124 is configured to conform to the surfaces that form the openings and leak paths described above. For example, the angled edge portion 378 of the side covers 376 (FIG. 3C) help the side seals 124 to conform and seal around a lip hinge 903 of the dock leveler 100. Moreover, as the side seals 124 move downwardly into contact with the pit floor 108 and/or the vehicle bumper 904, the notch or gap G allows the front finger 351 to deflect toward the rear finger 353 with relatively little compression of the corresponding foam core 372 (FIGS. 3A and 3B). This can reduce the amount of side seal cover fabric 374 that can bunch up as the deck 114 lowers into position. Conversely, if the side seal 124 were made from solid foam, that is, without the gap G, the fabric cover along the side surfaces could bunch up under deflection and become caught between the lip 116 and/or the trailer bumper 904. In addition, the beveled surface 360 (FIG. 3B) on the upper front portion of the side seal 124 can reduce the likelihood that the side sealing pad cover can become pinched or trapped between the lip 116 and the trailer bumper 904.

As those of ordinary skill in the art will appreciate, embodiments of the sealing system 120 and the side seal 124 disclosed above can improve over prior art seals because they can effectively seal the open areas defined above throughout the entire range, or at least approximately the entire range, of normal dock leveler operating conditions (e.g., maximum to minimum open areas). For example, embodiments of the side seals 124 can effectively seal even when the back of a trailer is approximately 2 or more inches away from the face of the dock bumpers 112, and/or when the lip 116 is at or near the maximum operating height relative to a trailer parked against the dock bumpers 112, and/or when the lip 116 is at the minimum operating height. Vent holes in the side seal cover 374, located, for example, proximate the upper rear face of the front finger 351 (FIGS. 3A and 3B) can allow air to escape and prevent the finger fabric cover from billowing and becoming trapped under the lip 116 during compression. In addition, vent/drain holes can also be located in or near the bottom surface of the cover 374.

Although various functional aspects of the side seals 124 have been described above with the deck lip 116 extended onto the bed 902 of the trailer 900, the sealing systems described herein can also be used with the deck lip 116 extended downwardly at approximately 90 degrees in an end-loading configuration. In such embodiments, the bottom surface of the lip 116 contacts the first upper surfaces 356a of the side seals 124 and rotates the seals 124 and the corresponding bottom seal 122 rearwardly about the upper attachment point of the bottom seal 122. As the lip 116 rotates further downward, the side seals 124 and bottom pad 122 continue to rotate rearward. When the leveler deck 114 is brought into an operating position, stop legs 906 contact the pit floor 108, and the side seals 124 become compressed under the leveler and behind the generally vertical lip 116. When the leveler deck 114 is subsequently raised, the side seals 124 return to their original profile shape without damage.

A further advantage of embodiments of the present disclosure is that because the side seals 124 and generally vertical bottom pad 122 are mounted to the underside of the dock leveler system 100, the pit floor 108 remains relatively unobstructed and cleaning the pit floor 108 is a relatively easy operation. In contrast to other types of levelers/pit seals designs which are mounted to the pit floor and/or to the face of the building just outside the pit floor, which can make cleaning of the pit cumbersome.

Embodiments of the bumper seals 126 described herein can be made from a heavy-duty, two-ply material that is both flexible and resilient, and has relatively good memory. One advantage of embodiments of the bumper seals 126 is that if a trailer does not back fully into a loading dock all the way, such that the rear of the trailer does not contact the face of the bumpers, the cover seal 126 can seal the remaining gap between the rear of the trailer and face of the bumper. Such gaps can also occur if the trailer backs into the loading dock at an angle and contacts only one of the two bumpers. Because the bumper seals 126 are flexible and resilient, the seals can recover and return to their original shapes when the trailer leaves the loading dock.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims. Moreover, although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

I claim:

1. A dock leveler sealing system for use with a dock leveler having a deck and an extendable lip, the sealing system comprising:
   a bottom seal configured to be attached to an underside portion of the deck and move up and down therewith; and
   a side seal configured to be attached to the bottom seal and extend forwardly therefrom, wherein the side seal includes:
      a lower surface portion;
      a forward surface portion configured to be positioned beneath the deck lip and face away from the bottom seal, the forward surface portion extending between the lower surface portion and a first upper surface portion; and
      an aft surface portion configured to be attached to the bottom seal, the aft surface portion extending between the lower surface portion and a second upper surface portion that is vertically offset from the first upper surface portion.

2. The dock leveler sealing system of claim 1 wherein the first upper surface portion is vertically offset from the lower surface portion by a first height, and wherein the second upper surface portion is vertically offset from the lower surface portion by a second height that is less than the first height.

3. The dock leveler sealing system of claim 1 wherein the bottom seal has a proximal edge portion configured to be attached to the underside portion of the deck and a distal edge portion configured to hang pendent therefrom, wherein the lower surface portion of the side seal is configured to be positioned adjacent the distal edge portion and the second upper surface portion of the side seal is configured to be positioned adjacent the proximal edge portion.

4. The dock leveler sealing system of claim 1 wherein the first upper surface portion is spaced apart from the second upper surface portion by a gap therebetween.

5. The dock leveler sealing system of claim 1 wherein the side seal includes:
   a forward finger bounded by at least a portion of the forward surface portion and the first upper surface portion; and
   an aft finger spaced apart from the forward finger by a gap therebetween, wherein the aft finger is bounded by at least a portion of the aft surface portion and the second upper surface portion.

6. The dock leveler sealing system of claim 1 wherein the side seal is a first side seal configured to be attached toward a first end portion of the bottom seal, wherein the sealing system further comprises a second side seal configured to be attached toward a second end portion of the bottom seal, and wherein the first and second side seals are at least approximately identical.

7. The dock leveler sealing system of claim 1 wherein the side seal includes a side surface extending between the aft surface portion and the forward surface portion, and wherein the side seal further comprises a replaceable cover releasably attached to the side surface.

8. The dock leveler sealing system of claim 1 wherein the first upper surface portion is spaced apart from the second upper surface portion by a gap therebetween, and wherein the side seal further comprises a replaceable cover realeasably disposed over the gap.

9. The dock leveler sealing system of claim 1 wherein the side seal includes a first side surface extending between the aft surface portion and the forward surface portion and an opposite second side surface extending between the aft surface portion and the forward surface portion, and wherein the first side surface is spaced apart from the second side surface by a side seal width of from about 4 inches to about 16 inches.

10. The dock leveler sealing system of claim 1 wherein the side seal is comprised of a resilient core material covered by a durable cloth.

11. The dock leveler sealing system of claim 1, further comprising a bumper seal configured to be attached to an upper portion of a dock bumper, wherein the side seal is configured to contact the bumper seal when the dock leveler is in a lowered position.

12. The dock leveler of claim 1, further comprising a beveled surface extending at an angle between the forward surface portion and the first upper surface portion.

13. The dock leveler sealing system of claim 1 wherein the first upper surface portion and the second upper surface portion are at least approximately parallel to each other.

* * * * *